US012674699B2

(12) United States Patent
Kopansky et al.

(10) Patent No.: US 12,674,699 B2
(45) Date of Patent: Jul. 7, 2026

(54) METHODS AND SYSTEMS FOR TESTING ELECTRO OPTIC SENSORS

(71) Applicant: Eaton Intelligent Power Limited, Dublin (IE)

(72) Inventors: Gregory Kopansky, Philadelphia, PA (US); John Joseph Zielinski, Southampton, PA (US)

(73) Assignee: Eaton Intelligent Power Limited, Dublin (IE)

( * ) Notice: Subject to any disclaimer, the term of this patent is extended or adjusted under 35 U.S.C. 154(b) by 375 days.

(21) Appl. No.: 18/098,744

(22) Filed: Jan. 19, 2023

(65) Prior Publication Data

US 2023/0236058 A1 Jul. 27, 2023

Related U.S. Application Data

(60) Provisional application No. 63/301,763, filed on Jan. 21, 2022.

(51) Int. Cl.
*G01F 25/20* (2022.01)
*G01F 23/292* (2006.01)

(52) U.S. Cl.
CPC ............ *G01F 25/20* (2022.01); *G01F 23/292* (2013.01)

(58) Field of Classification Search
CPC ............................... G01F 23/292; G01F 25/20
See application file for complete search history.

(56) References Cited

U.S. PATENT DOCUMENTS

| | | | | |
|---|---|---|---|---|
| 4,354,180 A | * | 10/1982 | Harding | G08B 29/04 |
| | | | | 250/577 |
| 4,961,069 A | * | 10/1990 | Tsaprazis | G01F 23/2925 |
| | | | | 250/577 |
| 4,979,797 A | * | 12/1990 | Nemeth | G01F 23/2927 |
| | | | | 385/12 |
| 4,998,022 A | * | 3/1991 | Tregay | G01F 23/2925 |
| | | | | 356/136 |
| 5,088,324 A | * | 2/1992 | Nemeth | G02B 5/04 |
| | | | | 250/577 |

(Continued)

FOREIGN PATENT DOCUMENTS

EP        3318849 A1      5/2018

OTHER PUBLICATIONS

European Extended Search Report in Application 23152610.4, mailed Apr. 26, 2023, 8 pages.

*Primary Examiner* — John Fitzgerald
(74) *Attorney, Agent, or Firm* — Merchant & Gould P.C.

(57) ABSTRACT

Methods and systems for in-fluid testing of electro optic liquid sensors are provided. The electro optic sensor has a light source and a light detector such that a first power state is applied to the light source to generate a first light for determining whether liquid is present within the electro optic sensor. Based on a determination that liquid is present within the electro optic sensor, a second power state is applied to the light source for generating a second light. The second power state having higher power over a shorter period of time than the first power state. The second light generated from the light source is reflected and the reflected second light is received at the light detector. The reflected second light is compared to a pulse current threshold value to determine whether the electro optic sensor is functioning properly.

9 Claims, 5 Drawing Sheets

(56) References Cited

U.S. PATENT DOCUMENTS

| | | | | |
|---|---|---|---|---|
| 5,381,022 A * | 1/1995 | Nemeth | ............. | G01F 23/2927 |
| | | | | 250/577 |
| 5,452,076 A | 9/1995 | Schopper | | |
| 5,534,708 A | 7/1996 | Ellinger | | |
| 5,765,994 A * | 6/1998 | Barbier | ............. | F04B 39/0207 |
| | | | | 62/193 |
| 5,785,100 A * | 7/1998 | Showalter | ............. | B67D 7/362 |
| | | | | 141/59 |
| 6,043,505 A * | 3/2000 | Ames | ................ | G01N 33/2888 |
| | | | | 250/225 |
| 6,049,088 A * | 4/2000 | Harding | ............. | G01F 23/2925 |
| | | | | 250/577 |
| 7,388,222 B2 * | 6/2008 | Zhang | ................ | G01F 23/2925 |
| | | | | 250/577 |
| 8,302,473 B2 * | 11/2012 | Ramus | ................... | A47J 31/44 |
| | | | | 73/290 R |
| 9,316,522 B2 * | 4/2016 | Kopansky | ........... | G01F 23/2925 |
| 9,316,524 B2 * | 4/2016 | Kopansky | .............. | G01F 23/02 |
| 10,222,251 B2 | 3/2019 | Kopansky et al. | | |
| 10,620,032 B2 | 4/2020 | Kopansky | | |
| 10,627,281 B2 | 4/2020 | Kopansky et al. | | |
| 11,137,278 B2 * | 10/2021 | Kopansky | ........... | G01F 23/2922 |
| 11,268,844 B2 * | 3/2022 | Kopansky | ............. | G01F 23/292 |
| 11,300,438 B2 * | 4/2022 | Kopansky | ........... | G01F 23/2922 |
| 11,680,840 B2 * | 6/2023 | Kopansky | ........... | G01F 23/2922 |
| | | | | 250/576 |
| 11,781,896 B2 * | 10/2023 | Kopansky | ............. | G01F 23/292 |
| | | | | 73/327 |
| 2016/0202108 A1 * | 7/2016 | Kopansky | ........... | G01F 23/2922 |
| | | | | 250/576 |
| 2018/0031407 A1 * | 2/2018 | Kopansky | ........... | G01F 23/2922 |
| 2021/0003441 A1 | 1/2021 | Kopansky | | |
| 2021/0239508 A1 | 8/2021 | Kopansky | | |

* cited by examiner

METHODS AND SYSTEMS FOR TESTING ELECTRO OPTIC SENSORS

CROSS-REFERENCE TO RELATED APPLICATIONS

This application claims priority to and the benefit of U.S. Provisional Patent Application No. 63/301,763, filed Jan. 21, 2022, and which is incorporated by reference herein in its entirety.

BACKGROUND

The present disclosure relates generally to liquid sensors and, more specifically, to electro optic liquid sensors.

Electro optic sensors are utilized for detecting the presence of liquid. One known electro optic sensor includes a light source, a prism, and a light detector. In operation, light emitted from the light source may be returned to the light detector by the prism only if no liquid is present. If liquid is present, no light may be returned to the light detector. However, a faulty electro optic sensor may be indistinguishable from the presence of liquid in the electro optic sensor. As such, in-fluid testing has been developed whereby light can be returned to the light detector through the liquid. Known in-fluid testing, however, has limitations, for example, liquids with high light absorption may not return light and high power load requirements are often needed. Improvements are therefore desired.

SUMMARY

Aspects of the present disclosure relate to methods and systems for in-fluid testing of electro optic liquid sensors.

In an aspect, the technology relates to a method of testing an electro optic sensor having a light source and a light detector, the method including: applying a first power state to the light source to generate a first light for determining whether liquid is present within the electro optic sensor; based on a determination that liquid is present within the electro optic sensor, applying a second power state to the light source for generating a second light, wherein the second power state has higher power over a shorter period of time than the first power state; reflecting the second light generated from the light source; receiving the reflected second light at the light detector; and comparing the reflected second light to a pulse current threshold value to determine whether the electro optic sensor is functioning properly.

In an example, receiving the reflected second light further includes adjusting detection parameters of the light detector for receiving the reflected second light. In another example, the method further includes: based on a determination that liquid is not present within the electro optic sensor, applying a third power state to the light source; receiving a third light at the light detector; and comparing the third light to a shunt threshold value to determine whether the electro optic sensor is functioning properly. In still another example, the third power state is a shunt power and the third light is not generated from the light source. In yet another example, the first power state and the second power state are at least partially defined by current applied to the light source. In an example, the light source is a LED light and the second power state is at least partially defined by a peak current level of the LED light.

In another example, the second power state corresponds to a peak current level of the light source and the first power state corresponds to a constant current level of the light source. In still another example, applying the second power state further includes defining the period of time for applying the second power state. In yet another example, the step of determining whether liquid is present within the electro optic sensor occurs at a greater frequency than the step of determining whether the electro optic sensor is functioning properly. In an example, after the first power state is applied to the light source the method further includes: reflecting the first light generated from the light source; receiving the reflected first light at the light detector; and comparing the reflected first light to a constant current threshold value to determine whether liquid is present in the electro optic sensor.

In another aspect, the technology relates to an electro optic sensor system including: an electro optic sensor including: a light source; a light detector; a prism; and a reflective optical member; a power source coupled to the electro optic sensor; and an electronic control unit configured to: apply a first power state to the light source via the power source to generate a first light for and determine whether liquid is present within the electro optic sensor; based on a determination that liquid is present, apply a second power state to the light source via the power source to generate a second light, wherein the second power state has higher power over a shorter period of time than the first power state; reflect the second light generated from the light source; receive the reflected second light at the light detector; and compare the reflected second light to a pulse current threshold to determine whether the electro optic sensor is functioning properly.

In still another aspect, the technology relates to an electro optic sensor system including: an electro optic sensor including: a light source; a light detector; a prism; and a reflective optical member; a power source coupled to the electro optic sensor; and an electronic control unit configured to operate in at least a liquid determination mode and a test mode, wherein the liquid determination mode determines whether liquid is present within the electro optic sensor based on a first power state applied to the light source via the power source to generate a first light, and wherein the test mode determines whether the electro optic sensor is functioning properly, the test mode including an in-fluid control circuit that applies a second power state to the light source via the power source for generating a second light when liquid is determined to be present within the electro optic sensor, wherein the second power state has higher power over a shorter period of time than the first power state.

In an example, the light detector is configured to receive reflected light and detection parameters of the light detector for the liquid determination mode and the test mode are different. In another example, the test mode further includes an in-air control circuit that applies a third power state to the light source via the power source when liquid is determined not to be present within the electro optic sensor. In still another example, the liquid determination mode is connected in parallel with the test mode. In yet another example, the power source is configured to change applied current to define the applied power state. In an example, the light source is a LED light and the second power state is at least partially defined by a peak current level of the LED light.

In another example, the liquid determination mode operates at a greater frequency than the test mode. In still another example, the liquid determination mode occurs prior to the test mode. In yet another example, in the liquid determination mode, the determination of whether liquid is present in the electro optic sensor is based on a comparison of a reflected first light with a constant current threshold value, and in the test mode, the determination of whether the electro optic sensor is functioning properly is based on a comparison of a reflected second light with a pulse current threshold value.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

An electro optic sensor described herein uses short duration current pulses at higher current levels than long duration contestant current values of a light source disposed therein during an in-fluid test mode operation of the electro optic sensor. As such, the power supplied to the light source for generating light beams during the in-fluid test mode is different than the power supplied to the light source during a liquid determination mode that uses long duration contestant current values. Through use of a short duration and high current test mode pulse, improvement of the electro optic sensor is provided and use of the electro optic sensor can be expanded into additional applications. In an example, the higher current levels for the short duration current pulses may correspond to peak current levels of the light source.

Additionally, performance and reliability of the electro optic sensor are improved, and expanded thermal limits for the electro optic sensor are provided for higher operational temperatures. For example, the electro optic sensor described herein can be used with a wider variety of liquids, such as liquid with higher light absorption because the generation of the test light beams can have greater intensity, when compared to electro optic sensors that do not use high or peak level current pulses for generation of light beams. Additionally, the electro optic sensor can be used with components that have increased temperature operation because of decreased thermal stress on the light source and its high current portion and power management circuitries. The lower thermal stresses on the light source also increases reliability of the electro optic sensor.

Another advantage of using a short duration and high current test mode pulse is to reduce the electrical power consumption of the electro optic sensor because the average current during the test mode is decreased. As such, power management is increased for the electro optic sensor during operation thereof. Furthermore, the signal to noise ratio of the light detector during the test mode is improved.

Figure 1:
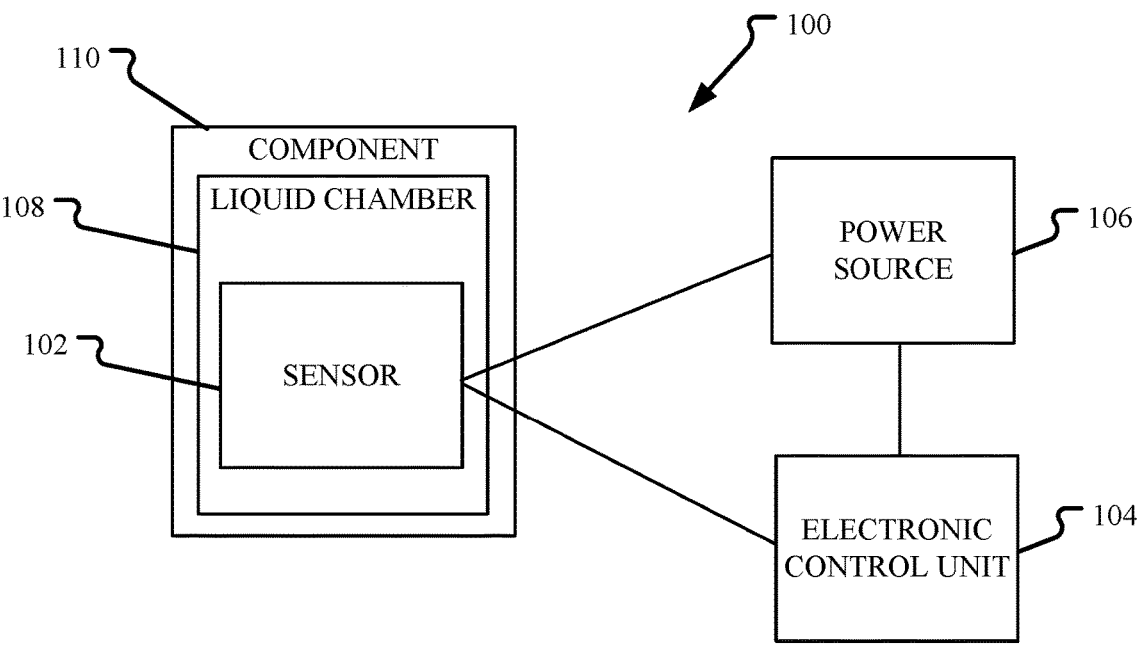
FIG. 1 is a block diagram view of an exemplary sensor system in accordance with principles of the present disclosure.

FIG. 1 is a block diagram view of an exemplary sensor system 100. The sensor system 100 includes an electro optic sensor 102, an electronic control unit 104, and a power source 106. The electro optic sensor 102 is configured to determine a presence of a liquid as described herein. In the example, the electro optic sensor 102 may be disposed within a liquid chamber 108 of a component 110. The electro optic sensor 102 is coupled to the power source 106 such that power can be applied thereto during operation. Additionally, the electronic control unit 104 is operatively coupled to the electro optic sensor 102 and the power source 106 for control thereof.

The component 110 may be any component in any field (e.g., aerospace) that includes or may be exposed to liquid in its operation. For example, the component 110 may be or may be included in a mechanical, electrical, hydraulic, pneumatic, or other known actuator or actuation system. The component 110 may include the liquid chamber 108 that is configured to store or receive a liquid. The liquid may be, for example only, of a type necessary for the functionality of the component 110 (e.g., hydraulic fluid, liquid for lubrication, fuel, etc.), liquid incidental to the environment of the component 110, and/or liquid that is detrimental to the function of the component 110.

The electronic control unit 104 may be electrically coupled to the electro optic sensor 102 and may be configured to drive the electro optic sensor 102, receive feedback from the electro optic sensor 102, assess whether liquid is present or absent in the liquid chamber 108, and/or assess the operation state of the electro optic sensor 102. The electronic control unit 104 may be analog electronic device(s) and/or digital electronic device(s) as required or desired. Analog device(s) can include analog circuitry that is configured to carry analog signals for processing and application of the disclosure described herein. Digital device(s) can include digital components that is configured to carry digital signals for processing and application of the disclosure described herein. The electronic control unit 104 may include one or more of a processor, a non-volatile computer-readable memory, an application-specific integrated circuit (ASIC), field-programmable gate array (FPGA), and/or other known processing or memory device whether digital or analog. The electronic control unit 104 may be or may include a dedicated processing resource of the electro optic sensor 102, or may be or may include processing resources for numerous sensors, components, and/or systems. The electronic control unit 104 may be electrically coupled to the electro optic sensor 102 through known wired and/or wireless connections.

The power source 106 may be also electrically coupled to the electro optic sensor 102 and/or the electronic control unit 104 and configured to power the same. The power source may be or may include a dedicated power supply for the electro optic sensor 102, or may be or may include power supply for numerous sensors, components, and/or systems.

In an aspect, the power source 106 may be separate from the electronic control unit 104, while in other aspects, the power source 106 may be combined with the electronic control unit 104 as required or desired.

Figure 2:
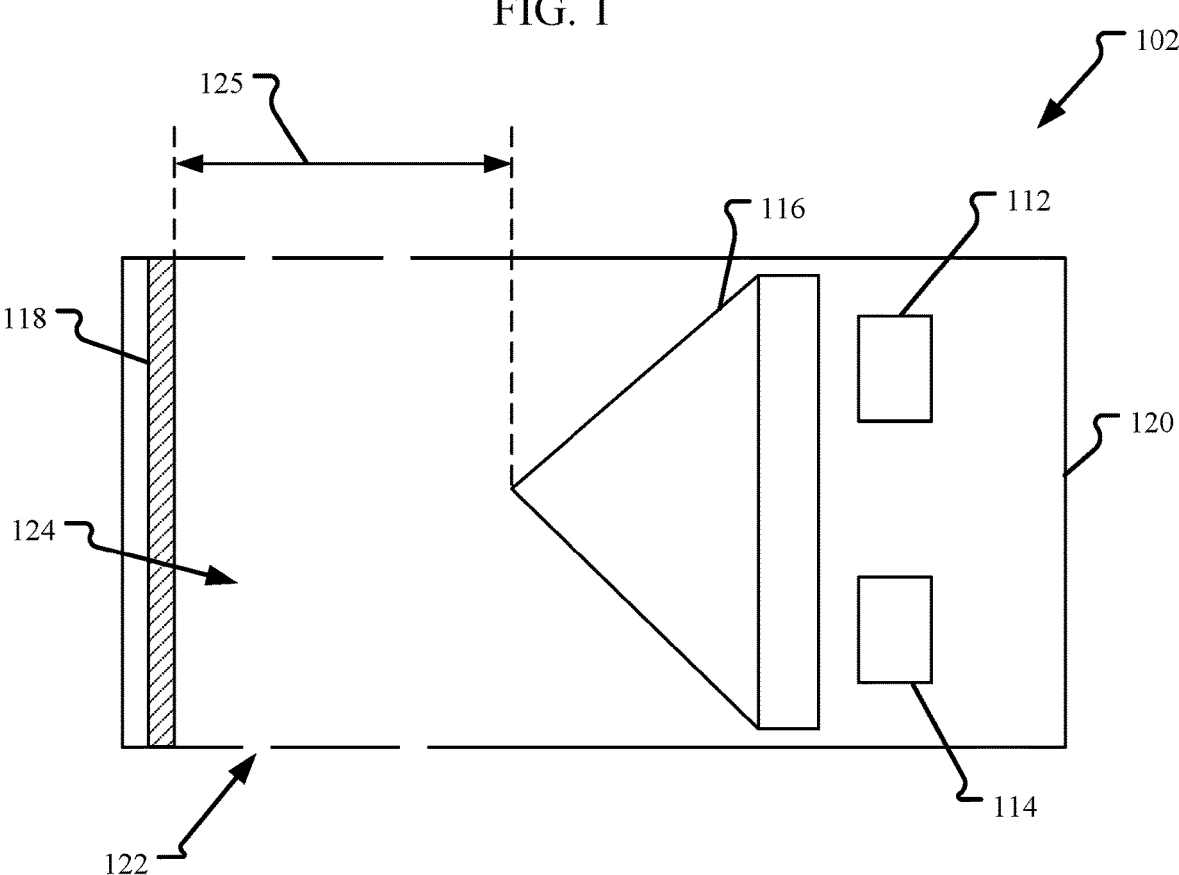
FIG. 2 is a schematic view of an exemplary electro optic sensor of the sensor system shown in FIG. 1.

FIG. 2 is a schematic view of the electro optic sensor 102 of the sensor system 100 (shown in FIG. 1). In the example, the electro optic sensor 102 includes a light source 112, a light detector 114, a prism 116, and a reflective optical member 118 (also known as an optical shield), all of which may be generally disposed within a housing 120. The housing 120 may include one or more liquid ports 122 for permitting liquid to flow into and out of a chamber 124 within the housing 120. The chamber 124 is at least partially defined by a gap between the prism 116 and the reflective optical member 118 having a distance 125. In an example, the distance 125 may be about an inch or less. It is appreciated that other distances may be employed as required or desired for the function of particular applications and components/liquids.

The light source 112 is configured to emit light (e.g., a light beam) at a plurality of intensities appropriate for a given application. For example, light intensity appropriate for the characteristics of the other elements of the sensor, such as shape, orientation, materials, reflectivity, etc., and/or according to characteristics of the liquid to be detected, such as density, scattering properties, etc. As used herein, light beam intensity includes either or both of a power state utilized to generate the light beam and a wavelength. In an example, the light source 112 may be configured to emit light in the visible, ultraviolet, and/or infrared (including near-infrared) wavelengths of the electromagnetic spectrum. In an aspect, the light source 112 is a light emitting diode (LED) whereby light is emitted when current flows through. In other examples, the light source 112 may be a laser or other know light source as required or desired. In examples that use a laser, the light source 112 may include a plurality of lasers so that the light source can change intensities during operation.

The light detector 114 is configured to detect the light emitted by the light source 112. In certain examples, the light detector 114 may be or may include one or more or a photodiode, phototransistor, and/or any other known light detecting device. In an aspect, the spectral responsivity and/or response time of the light detector 114 may be adjustable with respect to the different intensities of the light beam emitted from the light source 112.

The prism 116 is a member, article, or device including one or more components configured in size, shape, and materials to reflect light emitted from the light source 112 towards the light detector 114 in some conditions, and to pass light emitted from the light source 112 through the prism 116 in other conditions. For example, the prism 116 can reflect light emitted from the light source 112 towards the light detector 114 when liquid is not present within the chamber 124, and to pass light emitted from the light source 112 through the prism 116 when liquid is present within the chamber 124. The prism 116 may be formed from borosilicate glass, fused silica (quartz), one or more polymers, etc., that is optically transmissive at least to the light emitted from the light source 112. As such, the prism 116 is configured to be optically transmissive with respect to the different intensities of the light beam emitted from the light source 112.

The reflective optical member 118 is arranged and configured to reflect light emitted from the light source 112 that passes through the prism 116 towards the light detector 114. The reflective optical member 118 has a degree of reflectivity based at least partially on the different intensities of the light beam emitted from the light source 112. In an aspect, the reflective optical member 118 may have complete or near-complete reflectivity for the light emitted from the light source 112. In other examples, the reflective optical member 118 may have less than complete reflectivity for the light emitted from the light source 112.

In the depicted example, the reflective optical member 118 is disposed on an end of the housing 120 opposite the light source 112 and the light detector 114. The light source 112 is oriented so as to emit light in the direction of the reflective optical member 118 and the light detector 114 is oriented so as to receive light from the direction of the reflective optical member 118. The prism 116 is disposed between the light source 112 and the reflective optical member 118 and between the light detector 114 and the reflective optical member 118. As such, in some operating conditions of the electro optic sensor 102, the light may travel from the light source 112, through the prism 116, through the chamber 124, toward the reflective optical member 118, to be reflected by the reflective optical member 118 back through the chamber 124 and the prism 116 towards the light detector 114. The distance 125 between the reflective optical member 118 and the prism 116 may be configured for the geometric relationship between the reflective optical member 118, the prism 116, the light detector 114, and the light source 112 so that the reflective optical member 118 effectively reflects the light emitted by the light source 112 to be at least partially returned towards the light detector 114. While in other operating conditions, the light may travel from the light source 112, towards the prism 116, to be reflected by the prism 116 back towards the light detector 114. The position and shape of the prism 116 may be configured for the geometric relationship between the prism 116, the light detector 114, and the light source 112 so that the prism 116 effectively reflects the light emitted by the light source 112 towards the light detector 114.

Figures 3, 4:
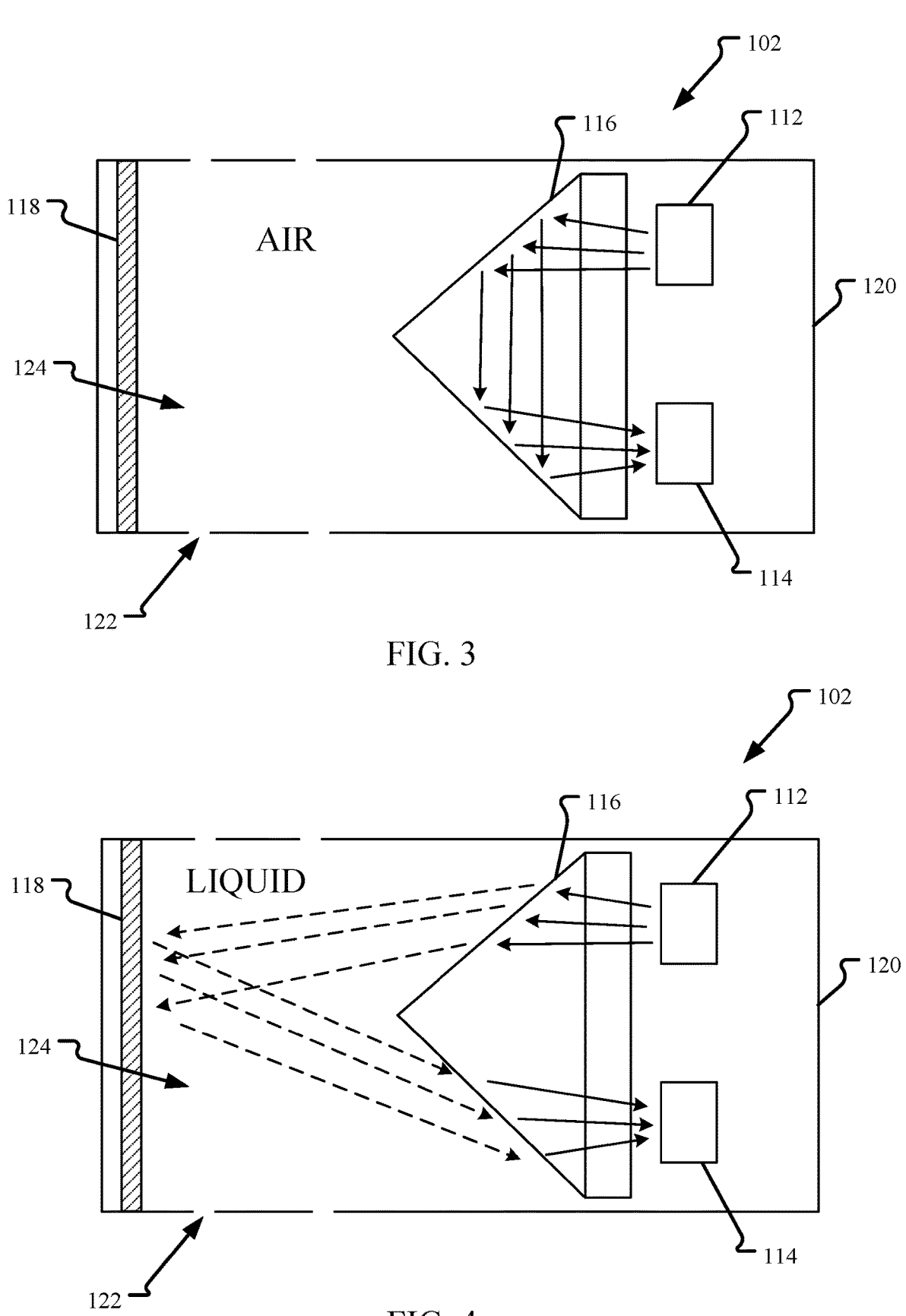
FIG. 3 is a schematic view of the electro optic sensor shown in FIG. 2 in a first operating configuration in accordance with the principles of the present disclosure.
FIG. 4 is a schematic view of the electro optic sensor shown in FIG. 2 in a second operating configuration in accordance with the principles of the present disclosure.

FIG. 3 is a schematic view of the electro optic sensor 102 in a first operating configuration. FIG. 4 is a schematic view of the electro optic sensor 102 in a second operating configuration. Referring concurrently to FIGS. 3 and 4, certain components are described above and not necessarily described further. In the example, the electro optic sensor 102 is configured to detect the presence of liquid by returning a different amount of light from the light source 112 to the light detector 114 when liquid is present in the chamber 124 than when liquid is not present in the chamber 124. As shown in FIG. 3, when no liquid is present in the chamber 124 and the chamber 124 is filled with air, the prism 116 returns light from the light source 112 to the light detector 114. In an aspect, the prism 116 may return substantially all of the light emitted by the light source 112 to the light detector 114 when no liquid is present (e.g., air in the chamber 124).

In contrast, as shown in FIG. 4, when the chamber 124 is filled with liquid, the prism 116 enables light from the light source 112 to pass through towards the reflective optical member 118, and reflected light from the reflective optical member 118 to pass through towards the light detector 114. In aspect, the liquid within the chamber 124 may partially disperse the light so that less light is received back at the light detector 114 than originally emitted from the light source 112. In another aspect, the liquid within the chamber 124 may fully disperse the light so that no light is received back at the light detector 114 from the originally emitted light from the light source 112. Accordingly, a relatively higher amount of light received by the light detector 114 may be associated with the absence of liquid from the chamber 124, and a relatively smaller amount of light received by the light detector 114 may be associated with the presence of liquid in the chamber 124. In examples, when liquid is present within the electro optic sensor 102 and when the electro optic sensor 102 operates in a liquid determination mode, the liquid fully disperses the light so that detection of no light at the light detector 114 corresponds with the presence of liquid in the chamber 124. However, when liquid is present within the electro optic sensor 102 and when the electro optic sensor 102 operates in a test mode, the power of the light increases so that the light is only partially dispersed and a portion of light is reflected back at the light detector 114 and as illustrated in FIG. 4. The liquid determination mode and the test mode are described further below.

As described in U.S. Pat. No. 10,222,251, and which is incorporated by reference in its entirety herein, the electro optic sensor 102 is configured to operate in both a liquid determination mode and a test mode so as to determine whether liquid is present in the chamber 124 (e.g., liquid determination mode) and to determine whether the electro optic sensor 102 is or is not operating properly (e.g., test mode). In the liquid determination mode, the light source 112 generates a first light beam configured for the characteristics of the components of the electro optic sensor 102 and the liquid being detected, and reflected first light is received at the light detector 114. Based on the reflected first light received at the light detector 114, whether liquid is present within the chamber 124 of the electro optic sensor 102 can be determined. This determination of whether liquid is present within the electro optic sensor 102 is also used in the test mode. In the test mode, if liquid is determined to be present, the light source 112 generates a second light beam that is of higher intensity to ensure that if liquid is present, the light will have sufficient energy to propagate through the liquid and be received back at the light detector 114. Based on the reflected second light received at the light detector 114, the functioning of the electro optic sensor 102 is determined. Additionally, if liquid is determined not to be present, the light source 112 generates a third light beam. Based on the reflected third light received at the light detector 114, the functioning of the electro optic sensor 102 is determined. This test mode of the electro optic sensor 102 is known as a built-in-test function.

Known electro optic sensors with built-in-test functionality use long duration (e.g., constant) direct current applied to a light source to generate both a first light beam and a second light beam, with the long duration direct current being higher for the second light beam. However, many light sources (e.g., LEDs) have maximum continuous current thresholds that limit the intensity of the second light beam, because exceeding the continuous current thresholds may damage the components of the light source. Additionally, use of high level long duration direct current limits the use of the electro optic sensor in high temperature applications that utilize significantly lower applied direct current levels so as to maintain component integrity and long-term reliability. Further, high level long duration direct current also increases the power consumption of the electro optic sensor during testing operations.

Given the foregoing, the built-in-test functionality described herein for the electro optic sensor 102 uses short duration current pulses at high current levels for the light source 112. As used herein, a high current level is defined as a current value that enables operation of the light source 112 without component damage for a specified short amount of time. For example, a light source may have a 100 mA continuous current rating and a peak current rating of 300 mA for a 10 microsecond duration every 50 milliseconds. As such, a high current level is greater than continuous or constant current for the light source 112. In some examples, the high current level may correspond to the peak current rating for the light source 112. In other examples, the high current level may be between the continuous or constant current and the peak current rating for the light source 112. The high current level may be at least partially based on the properties of the liquid that the electro optic sensor 102 is sensing.

Through use of a short duration and high current test mode pulse, improvement of the electro optic sensor 102 is provided and use of the electro optic sensor 102 can be expanded into additional applications. Additionally, performance and reliability of the electro optic sensor 102 are improved, and expanded thermal limits for the electro optic sensor 102 are provided for higher operational temperatures. For example, the electro optic sensor 102 can be used with a wider variety of liquids, such as liquid with higher light absorption because the generation of the test light beams can have greater intensity. Additionally, the electro optic sensor 102 can be used with components that have increased temperature operation because of decreased thermal stress on the light source 112 and its high current portion and power management circuitries. The lower thermal stresses on the light source 112 also increase reliability of the electro optic sensor 102.

Another advantage of using a short duration and high current test mode pulse is to reduce the electrical power consumption of the electro optic sensor 102 because the average current during the test mode is decreased. As such, power management is increased for the electro optic sensor 102 during operation thereof. Furthermore, the signal to noise ratio for the light detector 114 during the test mode is improved.

Figure 5:
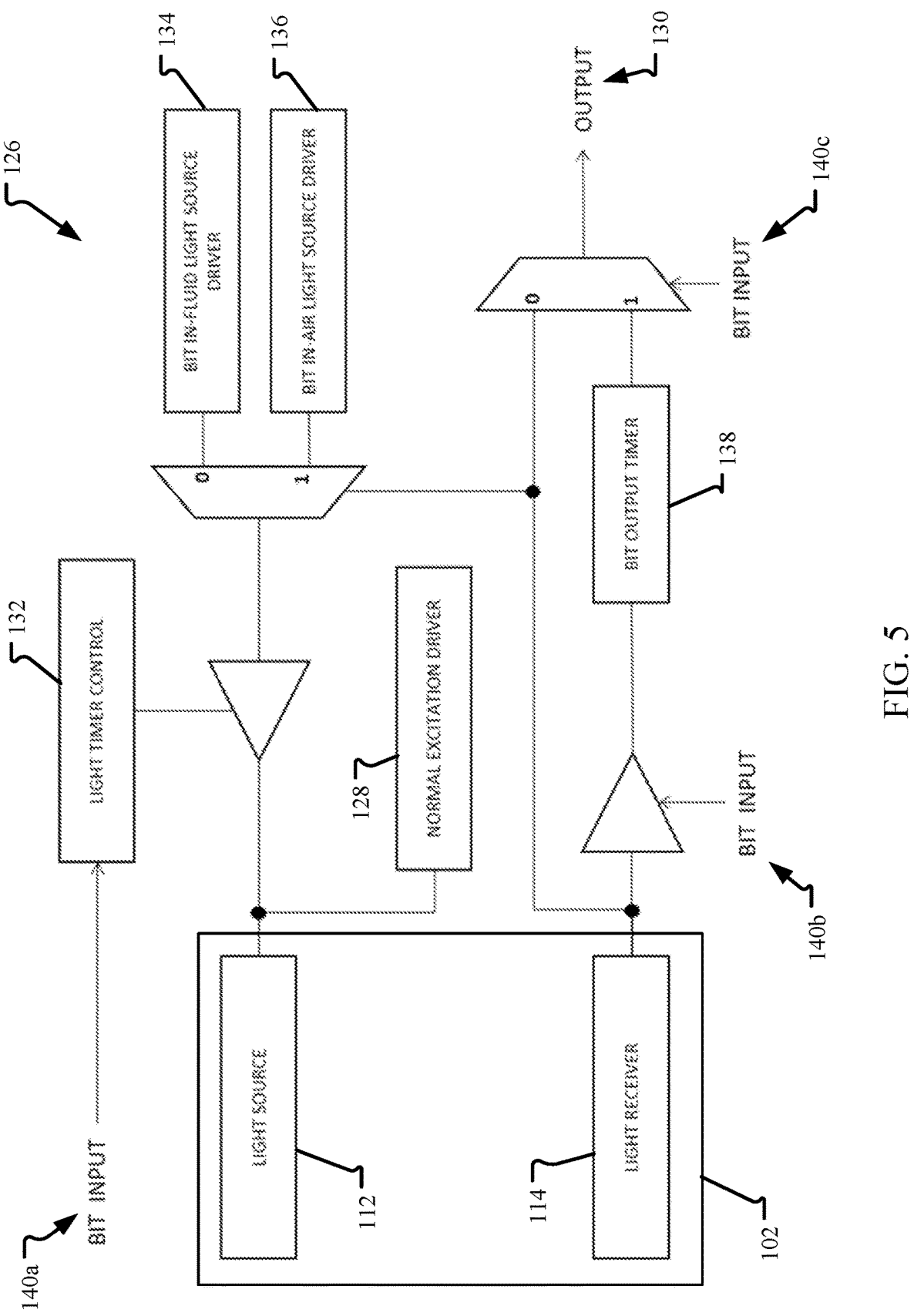
FIG. 5 is a block diagram view of exemplary sensor control electronics for the electro optic sensor shown in FIG. 2.

FIG. 5 is a block diagram view of exemplary sensor control electronics 126 for the electro optic sensor 102. In an example, the sensor control electronics 126 may form part of the electronic control unit 104 described above in reference to FIG. 1 for operation of the electro optic sensor 102. The electro optic sensor 102 includes the light source 112 configured to generate light and the light detector 114 configured to receive the light either reflected from the prism 116 or the reflective optical member 118 (both shown in FIGS. 3 and 4). The sensor control electronics 126 are configured to operate in both a liquid determination mode and a test mode, also referred to as a built-in-test (BIT) mode.

In the liquid determination mode, the sensor control electronics 126 operates a control circuit whereby a normal excitation driver 128 is used to generate a first light emitted from the light source 112 so that the reflected first light received by the light detector 114 is used to determine whether liquid is present within the electro optic sensor 102. In the example, the normal excitation driver 128 applies a first power state to the light source 112 such that the first light being generated has a first intensity. The first power state may be from a constant long duration power that can be based on current applied to the light source 112 and may correspond to the continuous current rating of the light source 112. The reflected first light is received at the light detector 114 and the received intensity of the reflected first light is an output value 130 that is used to compared to a constant current threshold value so as to determine whether liquid is present in the electro optic sensor 102. In an aspect, if the intensity of the reflected first light is less than the constant current threshold value, liquid is determined to be present within the electro optic sensor 102, while if the intensity of the reflected first light is approximately equal to or more than the constant current threshold value, liquid is determined not to be present within the electro optic sensor 102. This is because liquid within the electro optic sensor 102 will disperse light traveling therethrough resulting in the reflected light having reduced intensity at the light detector 114. The liquid determination mode can be performed at any frequency (e.g., time period) as required or desired by the component containing the liquid.

Based on the determination of liquid within the electro optic sensor 102, the sensor control electronics 126 may also operate the electro optic sensor 102 in the BIT mode that is used to determine whether the electro optic sensor 102 is functioning properly. In the example, the BIT mode can be performed with less frequency (e.g., time period) than the liquid determination mode as determining proper function of the electro optic sensor 102 is not required to follow every liquid determination. The BIT mode includes two different control circuits, which are determined by the state of the output of the liquid determination mode, and whether liquid is determined to be present within the electro optic sensor 102 or not. When initiated, the BIT mode is connected in parallel with the normal excitation driver 128. For example, the BIT mode is executed, in embodiments, by a multiplexed test driver arranged in parallel with normal excitation driver 128. The initiation of the BIT mode may be based on any number of triggers for the sensor control electronics 126. In an aspect, the BIT mode may be performed at predetermined time intervals so as to periodically check the functionality of the electro optic sensor 102. These predetermined time intervals may be longer in duration than the checking of liquid within the electro optic sensor 102. In other examples, the BIT mode may be performed upon a diagnostics check of the electro optic sensor 102, the component, and/or control unit. In still other examples, the BIT mode may be performed upon a predetermined condition present or not present within the electro optic sensor 102, the component, and/or control unit. Other triggering events are also contemplated herein.

The BIT mode includes a light timer control 132 that initiates the BIT control circuit, which in turn controls excitation to the light source 112 via an in-fluid light source driver 134 or an in-air light source driver 136 which can be multiplexed in order to drive operation of the light source 112. In examples, in-fluid light source driver 134 and in-air light source driver 136 together form a multiplexed test driver which executes the BIT mode. In the example of FIG. 5, the multiplexed test driver, including in-fluid light source driver 134 and in-air light source driver 136, is shown in parallel with normal excitation driver 128. In a first control circuit, the in-fluid light source driver 134 is used when liquid presence is detected to generate a second light emitted from the light source 112 so that the reflected second light received by the light detector 114 is used to determine whether the electro optic sensor 102 is functioning properly. In the example, the in-fluid light source driver 134 applies increased power to the light source 112 such that the second light being generated has a second intensity. Because increased power is applied to the light source 112, the intensity of the second light is greater than the first light. By increasing light intensity in the in-fluid BIT control circuit, reliability of test mode increases and a wider range of liquid can be present within the electro optic sensor 102.

As described above, however, increasing long duration constant current power is undesirable. As such, a different power state than the power state applied during the liquid determination mode is applied. In the example, this second power state is a short duration power pulse that is applied to the light source 112 so as to generate the second light. The second power state and the short duration power pulse has a higher power over a shorter period of time than the first power state and the long duration power applied to the first light as described above. The short duration power pulse can be based on current applied to the light source 112 and may correspond to the high current level and/or peak current rating of the light source 112. As such, the in-fluid light source driver 134 applies additional current to the light source 112 when liquid is present within the electro optic sensor 102. The reflected second light is received at the light detector 114 and the intensity of the reflected second light is used as the output value 130 so as to compare to a pulse current threshold value and to determine whether the electro optic sensor 102 is functioning properly. In an aspect, if the intensity of the reflected second light is greater than the pulse current threshold value, the electro optic sensor 102 is determined to be functioning properly, while if the intensity of the reflected second light is approximately equal to or less than the pulse threshold value, the electro optic sensor 102 is determined not to be functioning properly.

In order to extend the second power state and the short duration power pulse on the light detector 114, a BIT output timer 138 is triggered so that the reflected second light can be used to determine whether the electro optic sensor 102 is functioning properly. The BIT output timer 138 can be adjusted independently to conform to the necessary indication requirements for a specific application and the short duration power pulse. That is, the BIT output timer 138 enables adjustment of one or more detection parameters of the light detector 114 so as to more efficiently receive the reflected second light. In an aspect, a detection parameter may be a time period for detecting the reflected second light. As such, the second power state with the short duration power pulse and the first power state with the long duration power may require different detection parameters for the light detector 114. When the BIT output timer 138 is triggered, the output value 130 of the electro optic sensor 102 (e.g., reflected light intensity) can be multiplexed so that the intensity of the reflected second light is used to determine whether the electro optic sensor 102 is functioning properly in the BIT mode.

In a second control circuit, the in-air light source driver 136 is used when liquid presence is not detected to generate a third light emitted from the light source 112 so that the reflected third light received by the light detector 114 is used to determine whether the electro optic sensor 102 is functioning properly. In the example, the in-air light source driver 136 applies a third power state to the light source 112 such that the third light being generated has a third intensity. In an aspect, the third power state is a shunt power and turns the light source 112 off so that no light is being generated. The third power state and the shunt power can be based on current applied to the light source 112 and may be different than the first power state with the long duration power and second power state with the short duration power pulse described above. The reflected third light is received at the light detector 114 and used at the output value 130. The intensity of the reflected third light is then compared to a shunt threshold value so as to determine whether the electro optic sensor 102 is functioning properly. In an aspect, the shunt threshold value is an intensity that is higher than a properly-functioning sensor could detect. As such, if the intensity of the reflected third light is less than the shunt threshold value, the electro optic sensor 102 is determined to be functioning properly, while if the intensity of the reflected third light is approximately equal to or more than the shunt threshold value, the electro optic sensor 102 is determined not to be functioning properly.

As shown in FIG. 5, a BIT input 140*a,b,c* controls three functions of the BIT mode described above. The BIT input 140*a* initiates the BIT excitation by triggering the light timer control 132 circuit. The BIT input 140*b* allows a normal output (e.g., the liquid determination mode) perturbation to trigger the BIT output timer 138. The BIT input 140*c* selects the timed BIT output pulse defined by the BIT output timer 138 or the normal output for the output value 130. In the example, the BIT input 140*a,b,c* are the same input controls for the sensor control electronics 126, but are illustrated as controlling three different areas. In other examples, the BIT input 140*a,b,c* may be separate input controls as required or desired.

In an example whereby the light source 112 is a LED, the in-fluid BIT control circuit may apply high current excitation directly to the LED. In an aspect, the pulse current may be about 100 mA, while its duration may be on the order of one millisecond. BIT acknowledgment by sensor output may be managed by restricting signal output to a short and easily detectable pulse. The duration of sensor output pulse may be on the order of 50-100 milliseconds. The output pulse may be managed via sensor output or via a dedicated BIT output. This configuration limits BIT duty cycle to a maximum of one millisecond of high current every one second and would result in increased BIT mode effectiveness, higher sensor reliability and higher temperatures limits by reducing thermal stresses imposed to the LED. It should be appreciated that the above numbers and values are only exemplary and other configurations that enable the BIT to function as described herein are also contemplated. By increasing the intensity of the light generated for the in-fluid BIT circuit, the signal (e.g., the light) being received at the light detector 114 is increased. As such, the signal to noise ratio at the light detector 114 is increased thereby further increasing performance of the electro optic sensor 102 as described herein.

Figure 6:
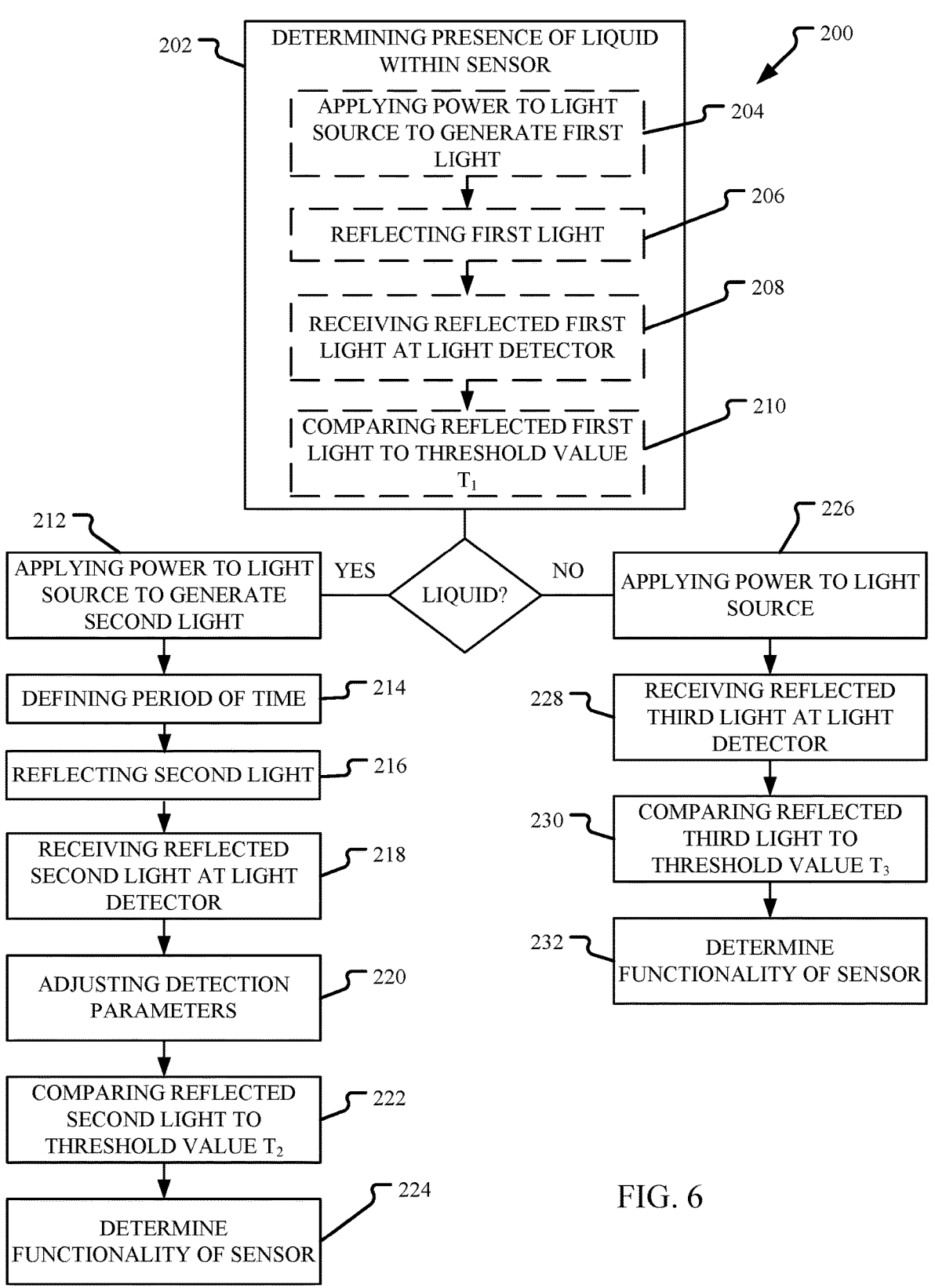
FIG. 6 is a flowchart illustrating an exemplary method of testing an electro optic sensor in accordance with the principles of the present disclosure.

FIG. 6 is a flowchart illustrating an exemplary method 200 of testing an electro optic sensor. The example methods and operations can be implemented or performed by the systems and devices described herein (e.g., the electro optic sensor system 100 shown in FIG. 1). The method 200 begins with determining whether liquid is present within the electro optic sensor at operation 202. The electro optic sensor has a light source and a light detector, and the liquid determination uses a first power state applied to the light source to generate a first light with a first intensity. The intensity of the first light may be selected according to the characteristics of the components of the sensor and according to the liquid to be detected. In an aspect, the first power state may be a long duration power that may correspond to a continuous current rating of the light source.

In an example, the determination of the presence of liquid at operation 202 may include applying the first power state to the light source for generating the first light at operation 204. The first light generated from the light source is reflected at operation 206 such that the reflected first light is received at the light detector at operation 208. The reflected first light is then compared to a constant current threshold value $T_1$ at operation 210. Based on the comparison at operation 210, the determination of the presence of liquid at the electro optic sensor is made. In an aspect, liquid may be determined to be present within the electro optic sensor if the reflected first light is less than the constant current threshold value $T_1$ and liquid may be determined not to be present within the electro optic sensor if the reflected first light is greater than or equal to the constant current threshold value $T_1$.

If liquid is determined to be present within the electro optic sensor, the method 200 continues to applying a second power state to the light source for generating a second light at a second intensity at operation 212. The second power state may include a short duration power pulse that has a higher power over a shorter period of time than the first power state with the long duration power. In an aspect, the intensity of the second light is higher than the intensity of the first light. The power being applied to the light source may be defined by current applied to the light source such that changing current values defines the power being applied to the light source. In an aspect, the second power state and the short duration power pulse may correspond to a high and/or peak current level of the light source. In an example, the light source may be a LED and the short duration power pulse is at least partially defined by a high and/or peak current level of the LED. In an example, the method 200 may further include defining the period of time for applying the second power state and the short duration power pulse at operation 214, thereby increasing power management of the system. The intensity of the second light may be selected according to the characteristics of the components of the electro optic sensor and according to the liquid to be detected.

The second light generated from the light source is reflected at operation 216 and the reflected second light is received at the light detector at operation 218. In some examples, the detection parameters of the light detector are adjusted for receiving the reflected second light at operation 220. In some examples, adjusting the detection parameters of the light detector includes defining a time period for receiving the reflected second light. The reflected second light is then compared to a pulse current threshold value $T_2$ at operation 222. Based on the comparison at operation 222, the electro optic sensor is determined whether to be functioning properly or not at operation 224. In an aspect, if the intensity of the reflected second light is greater than the pulse current threshold value, the electro optic sensor is determined to be functioning properly, while if the intensity of the reflected second light is approximately equal to or less than the pulse current threshold value, the electro optic sensor is determined not to be functioning properly.

However, if liquid is determined not to be present within the electro optic sensor, the method 200 continues to applying a third power state to the light source for generating a third light at a third intensity at operation 226. In an aspect, the third power state is a shunt power such that the light source is turned off and a third light is not generated, however, light may still be detected at the light detector due to ambient light within the system. As such, the third power state may be different than first and second power states described above. The power being applied to the light source may be defined by current applied to the light source such that changing current values defines the power being applied to the light source. The reflected third light is received at the light detector at operation 228. The reflected third light is then compared to a shunt threshold value $T_3$ at operation 230. In an aspect, the shunt threshold value $T_3$ may be set to an intensity of light that is higher than a properly-functioning electro optic sensor could detect given the intensity of the third light. Based on the comparison at operation 230, the electro optic sensor is determined whether to be functioning properly or not at operation 232. In an aspect, if the intensity of the reflected third light is less than the shunt threshold value, the electro optic sensor is determined to be functioning properly, while if the intensity of the reflected second light is approximately equal to or greater than the shunt threshold value, the electro optic sensor is determined not to be functioning properly.

The threshold values $T_1$, $T_2$, and/or $T_3$ for determining whether liquid is present and whether the electro optic sensor is functioning properly may be selected according to the characteristics of the liquid to be detected and the characteristics of the components and elements of the sensor. Additionally or alternatively, the threshold values $T_1$, $T_2$, and/or $T_3$ may be experimentally determined.

Operation 202 and the determination of whether liquid is present in the electro optic sensor may be considered steps of a liquid determination mode, while the other operations may be considered steps of a BIT test mode. The liquid determination assessment may be performed separately and independently from the operational state assessment. In an aspect, the liquid determination mode may be performed at a greater frequency than the BIT test mode. As such, generating the first light occurs at a greater frequency than the generation of the second light.

Figure 7:
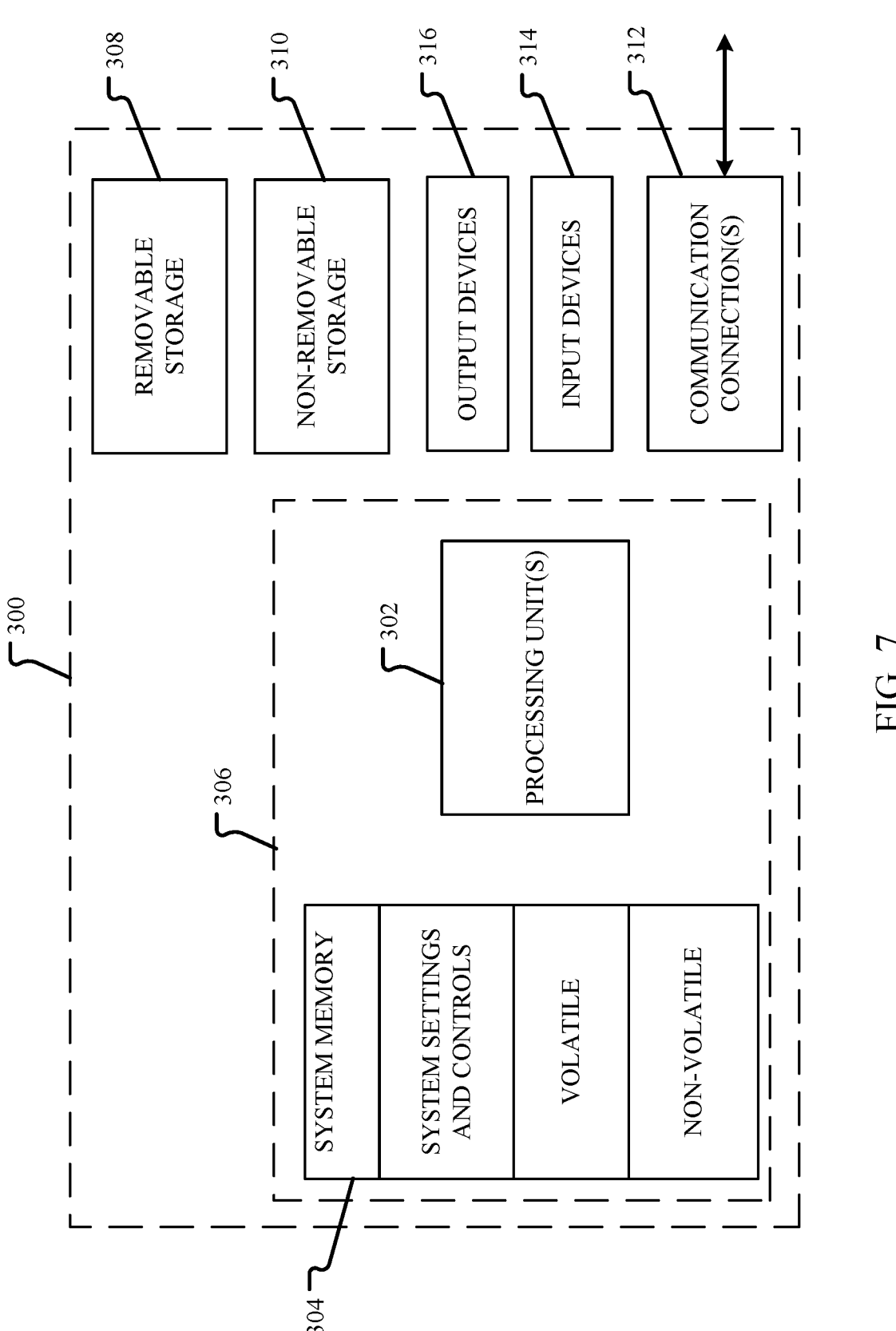
FIG. 7 is a block diagram view of an example suitable operating environment in which one or more of the present examples can be implemented.

FIG. 7 is a block diagram view of an example suitable operating environment 300 in which one or more of the present examples can be implemented. This operating environment may be incorporated directly into the electronic control unit for the electro optic sensor, e.g., such as the electronic control unit 104 and electro optic sensor 102 described in reference to FIG. 1. It should be appreciated that the operating environment 300 is only one example of a suitable operating environment and is not intended to suggest any limitation as to the scope of use or functionality. Other well-known computing systems, environments, and/or configurations that can be suitable for use includes, but are not limited to, personal computers, server computers, handheld or laptop devices, multiprocessor systems, microprocessor-based systems, programmable consumer electronics such as smart phones, network PCs, minicomputers, mainframe computers, tablets, distributed computing environments that includes any of the above systems or devices, and the like.

In its most basic configuration, the operating environment 300 typically includes at least one processing unit 302 and memory 304. Depending on the exact configuration and type of computing device, the memory 304 (storing, among other things, instructions to control the electro optical sensor) can be volatile (such as RAM), non-volatile (such as ROM, flash memory, etc.), or some combination of the two. This most basic configuration is illustrated in FIG. 7 by dashed line 306. Further, the operating environment 300 can also include storage devices (removable 308, and/or non-removable 310) including, but not limited to, magnetic or optical disks or tape. Similarly, the operating environment 300 can also have input device(s) 314 such as touch screens, keyboard, mouse, pen, voice input, etc., and/or output device(s) 316 such as a display, speakers, printer, etc. Also including in the operating environment 300 can be one or more communication connections 312, such as LAN, WAN, point-to-point, Bluetooth, RF, etc.

The operating environment 300 typically includes as least some form of computer readable media. Computer readable media can be any available media that can be accessed by processing unit 302 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 300 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

As described above, the operating environment 300 is generally described with respect to digital technology components and using a digital signal which may be converted from an analog signal. It is appreciated that the present examples may also be implemented in analog technology components and using an analog signal that form the operating environment 300. For example, in an analog operating environment, analog processing unit(s) with analog system setting and controls can be used. In aspects, timers, meters, and gates may be some analog components that form the operating environment. The analog operating environment can also have analog input and output devices along with analog communication connection(s).

This disclosure describes some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

Aspects of the Disclosure

Illustrative examples of the electro optic sensor disclosed herein are provided below. An embodiment of the electro optic sensor may include any one or more, and any combination of, the aspects described below.

Aspect 1. A method of testing an electro optic sensor having a light source and a light detector, the method comprising:

applying a first power state to the light source to generate a first light for determining whether liquid is present within the electro optic sensor;

based on a determination that liquid is present within the electro optic sensor, applying a second power state to the light source for generating a second light, wherein the second power state has higher power over a shorter period of time than the first power state;

reflecting the second light generated from the light source;

receiving the reflected second light at the light detector; and comparing the reflected second light to a pulse current threshold value to determine whether the electro optic sensor is functioning properly.

Aspect 2. The method of aspect 1, wherein receiving the reflected second light further comprises adjusting detection parameters of the light detector for receiving the reflected second light.

Aspect 3. The method of any one of the preceding aspects, further comprising:

based on a determination that liquid is not present within the electro optic sensor, applying a third power state to the light source;

receiving a third light at the light detector; and comparing the third light to a shunt threshold value to determine whether the electro optic sensor is functioning properly.

Aspect 4. The method of aspect 3, wherein the third power state is a shunt power and the third light is not generated from the light source.

Aspect 5. The method of any one of the preceding aspects, wherein the first power state and the second power state are at least partially defined by current applied to the light source.

Aspect 6. The method of aspect 5, wherein the light source is a LED light and the second power state is at least partially defined by a peak current level of the LED light.

Aspect 7. The method of aspect 5, wherein the second power state corresponds to a peak current level of the light source and the first power state corresponds to a constant current level of the light source.

Aspect 8. The method of any one of the preceding aspects, wherein applying the second power state further comprises defining the period of time for applying the second power state.

Aspect 9. The method of any one of the preceding aspects, wherein the step of determining whether liquid is present within the electro optic sensor occurs at a greater frequency than the step of determining whether the electro optic sensor is functioning properly.

Aspect 10. The method of any one of the preceding aspects, wherein after the first power state is applied to the light source the method further comprises:

reflecting the first light generated from the light source;

receiving the reflected first light at the light detector; and comparing the reflected first light to a constant current threshold value to determine whether liquid is present in the electro optic sensor.

Aspect 11. An electro optic sensor system comprising:

an electro optic sensor comprising:
    a light source;
    a light detector;
    a prism; and
    a reflective optical member;
a power source coupled to the electro optic sensor; and
an electronic control unit configured to:

apply a first power state to the light source via the power source to generate a first light for and determine whether liquid is present within the electro optic sensor;

based on a determination that liquid is present, apply a second power state to the light source via the power source to generate a second light, wherein the second power state has higher power over a shorter period of time than the first power state;

reflect the second light generated from the light source;

receive the reflected second light at the light detector; and compare the reflected second light to a pulse current threshold to determine whether the electro optic sensor is functioning properly.

Aspect 12. An electro optic sensor system comprising:

an electro optic sensor comprising:
    a light source;
    a light detector;
    a prism; and
    a reflective optical member;
a power source coupled to the electro optic sensor; and
an electronic control unit configured to operate in at least a liquid determination mode and a test mode, wherein the liquid determination mode determines whether liquid is present within the electro optic sensor based on a first power state applied to the light source via the power source to generate a first light, and wherein the test mode determines whether the electro optic sensor is functioning properly, the test mode including an in-fluid control circuit that applies a second power state to the light source via the power source for generating a second light when liquid is determined to be present within the electro optic sensor, wherein the second power state has higher power over a shorter period of time than the first power state.

Aspect 13. The electro optic sensor system of aspect 12, wherein the light detector is configured to receive reflected light and detection parameters of the light detector for the liquid determination mode and the test mode are different.

Aspect 14. The electro optic sensor system of any one of aspects 12-13, wherein the test mode further includes an in-air control circuit that applies a third power state to the light source via the power source when liquid is determined not to be present within the electro optic sensor.

Aspect 15. The electro optic sensor system of aspect 14, wherein the liquid determination mode is connected in parallel with the test mode.

Aspect 16. The electro optic sensor system of any one of aspects 12-15, wherein the power source is configured to change applied current to define the applied power state.

Aspect 17. The electro optic sensor system of aspect 16, wherein the light source is a LED light and the second power state is at least partially defined by a peak current level of the LED light.

Aspect 18. The electro optic sensor system of any one of aspects 12-17, wherein the liquid determination mode operates at a greater frequency than the test mode.

Aspect 19. The electro optic sensor system of any one of aspects 12-18, wherein the liquid determination mode occurs prior to the test mode.

Aspect 20. The electro optic sensor system of any one of aspects 12-19, wherein in the liquid determination mode, the determination of whether liquid is present in the electro optic sensor is based on a comparison of a reflected first light with a constant current threshold value, and in the test mode, the determination of whether the electro optic sensor is functioning properly is based on a comparison of a reflected second light with a pulse current threshold value.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. An electro optic sensor system comprising:
an electro optic sensor comprising:
    a light source;
    a light detector;
    a prism; and
    a reflective optical member;
a power source coupled to the electro optic sensor and comprising a normal excitation driver in parallel with a multiplexed test driver; and
an electronic control unit including a light timer control and configured to:
    apply a first power state to the light source via the normal excitation driver to generate a first light for and determine whether liquid is present within the electro optic sensor, wherein the first power state corresponds to a constant current level of the light source;
    based on a determination that liquid is present, apply a second power state to the light source via the multiplexed test driver to generate a second light, wherein the second power state corresponds to a peak current level of the light source and a duration of the second power state is controlled by the light timer control;
    reflect, by the reflective optical member, the second light generated from the light source;
    receive the reflected second light at the light detector; and
    compare the reflected second light to a pulse current threshold to determine whether the electro optic sensor is functioning properly.

2. An electro optic sensor system comprising:
an electro optic sensor comprising:
    a light source;
    a light detector;

a prism; and
    a reflective optical member;
a power source coupled to the electro optic sensor and comprising a normal excitation driver in parallel with a multiplexed test driver;
a light timer control; and
an electronic control unit configured to operate in at least a liquid determination mode and a test mode,
wherein the liquid determination mode determines whether liquid is present within the electro optic sensor based on a first power state applied to the light source via the normal excitation driver to generate a first light, wherein the first power state corresponds to a constant current level of the light source, and
wherein the test mode determines whether the electro optic sensor is functioning properly, the test mode including an in-fluid control circuit that applies a second power state to the light source via the multiplexed test driver for generating a second light when liquid is determined to be present within the electro optic sensor, wherein the second power state corresponds to a peak current level of the light source and a duration of the second power state is controlled by the light timer control.

3. The electro optic sensor system of claim 2, wherein the light detector is configured to receive reflected light and detection parameters of the light detector for the liquid determination mode and the test mode are different.

4. The electro optic sensor system of claim 2, wherein the power source is configured to change an applied driver of the normal excitation driver or the multiplexed test driver to define the applied power state.

5. The electro optic sensor system of claim 2, wherein the liquid determination mode operates at a greater frequency than the test mode.

6. The electro optic sensor system of claim 2, wherein the liquid determination mode occurs prior to the test mode.

7. The electro optic sensor system of claim 2, wherein in the liquid determination mode, the determination of whether liquid is present in the electro optic sensor is based on a comparison of a reflected first light, reflected by one of the prism and the reflective optical member, with a constant current threshold value, and in the test mode, the determination of whether the electro optic sensor is functioning properly is based on a comparison of a reflected second light, reflected by the reflective optical member, with a pulse current threshold value.

8. The electro optic sensor system of claim 2, wherein the test mode further includes an in-air control circuit that applies a third power state to the light source via an in-air light source driver of the multiplexed test driver when liquid is determined not to be present within the electro optic sensor.

9. The electro optic sensor system of claim 8, wherein the liquid determination mode is connected in parallel with the test mode.

* * * * *